Patented Sept. 12, 1922.

1,428,616

UNITED STATES PATENT OFFICE.

WILLIAM E. STOKES, OF ROCKVILLE CENTER, NEW YORK, ASSIGNOR TO UNITED STATES PROCESSES, INC., OF NEW YORK, N. Y., A CORPORATION OF NEW YORK.

PROCESS OF RECOVERING VANADIUM.

No Drawing.   Application filed January 19, 1921.   Serial No. 438,486.

*To all whom it may concern:*

Be it known that I, WILLIAM E. STOKES, a citizen of the United States of America, residing in Rockville Center, county of Nassau, and State of New York, have invented certain new and useful Improvements in Processes of Recovering Vanadium, of which the following is a specification.

This invention relates to processes of recovering vanadium, and aims to provide improvements therein.

The present invention provides a process involving a transposition of the vanadium compound in an ore, wherein a saving may be effected in the heat required to bring about the transposition, and consequently render the process economical in the amount of fuel used.

The invention further provides a process wherein the heat conditions are especially favorable to a transposition of the vanadium compound to the meta form, in which form its solubility is good.

Heretofore, it has been the practice to transpose vanadium ores by heating them with soda ash, mixed with one or more of common salt, sulphur and sulphur compounds, the heating being carried on at a comparatively high temperature, from 800° to 1200° C.

Such process or processes are comparatively expensive, due to the high temperature, and consequent use of fuel, necessary to produce the transposition, and the high temperature tends to transpose the vanadium compound to its ortho form, which form is less soluble than the meta form, and, hence, increases the difficulty of obtaining a complete extraction of the vanadium compound.

According to the present invention, I replace, in whole or in part, the transposing agents heretofore used, by a salt of an alkali-metal having a low melting point, such as sodium nitrate or potassium nitrate, and heat the mixture of ore and transposing agent of low melting point to a temperature which may be considerably less than the temperature heretofore employed, thereby effecting an economy of fuel, and, at the same time, producing a meta-compound of the vanadium, which, on leaching or extraction with water, or a weak acid or alkaline solution, readily and completely dissolves. The heat employed is advantageously approximately that of the melting point of the low melting-point transposing agent—in the case of sodium nitrate, for example, 316° C., and, in the case of potassium nitrate 337° C. The reaction will take place at a temperature somewhat below the fusion temperature of the transposing agent, but a convenient temperature is approximately that of the melting point of the transposing agent. The reaction will also take place at higher temperatures, but there is no advantage in using such higher temperatures.

After transposing, the soluble vanadium compound is dissolved, and recovered from the solution in any suitable or well known manner, usually by precipitation as vanadic oxide $V_2O_5$.

An example, or specific mode of practicing the process is as follows:—

Vanadium ore, for example, roscoelite, preferably crushed, is mixed with about 10%, by weight, of sodium nitrate, for example, and the mixture is then heated to preferably 316° C., the melting point of the sodium nitrate. Under furnace conditions, however, it will be understood that there is considerable variation, during normal working, from any given temperature. It will also be understood that good results, as regards to transfusion, can be obtained by heating to a comparatively high temperature, though such is unnecessary and uneconomical in the use of fuel. Moreover, the percentage named above, of the sodium nitrate, may be varied considerably, inasmuch as the percentage used is not of the greatest importance. After the vanadium constituents in the mixture of ore and sodium nitrate has been transposed, the soluble vanadate, mostly, if not entirely, the meta vanadate, is extracted in any suitable manner, as, for example, by leaching with a weak acid or alkaline solution, from which solution the vanadium constituent may be precipitated in suitable manner, for example, by adding any suitable acid, for example, sulphuric acid, to precipitate vanadic oxide $V_2O_5$, which is a form in which the vanadium is customarily marketed.

The invention may be practiced in other particular modes than that herein specifically described, and parts of the process may be practiced independently of other parts.

What is claimed is:—

1. A process of recovering vanadium, comprising heating an ore in admixture with an alkali-metal nitrate.

2. A process of recovering vanadium, comprising heating an ore in admixture with an alkali-metal nitrate, the temperature being approximately that of the melting point of the alkali-metal nitrate.

3. A process of recovering vanadium, comprising heating an ore in admixture with an alkali-metal nitrate, the temperature being between approximately 337° C. and 316° C.

4. A process of recovering vanadium, comprising heating an ore in admixture with sodium nitrate.

5. A process of recovering vanadium, comprising heating an ore in admixture with sodium nitrate, the temperature being approximately 316° C.

In witness whereof, I have hereunto signed my name.

WILLIAM E. STOKES.